US006827882B1

(12) United States Patent
Kitayama et al.

(10) Patent No.: US 6,827,882 B1
(45) Date of Patent: Dec. 7, 2004

(54) FLAME-RETARDANT POLYCARBONATE RESIN COMPOSITION AND MOLDED ARTICLES

(75) Inventors: Masahiro Kitayama, Ichihara (JP); Toshio Isozaki, Ichihara (JP); Akio Nodera, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 401 days.

(21) Appl. No.: 09/857,865

(22) PCT Filed: Oct. 6, 2000

(86) PCT No.: PCT/JP00/06995

§ 371 (c)(1),
(2), (4) Date: Jun. 12, 2001

(87) PCT Pub. No.: WO01/27201

PCT Pub. Date: Apr. 19, 2001

(30) Foreign Application Priority Data

Oct. 13, 1999 (JP) .......................................... 11-290484

(51) Int. Cl.⁷ ............................................... C09K 21/00
(52) U.S. Cl. ........................ 252/609; 524/500; 524/537
(58) Field of Search ...................... 252/609; 528/196, 528/198; 524/500, 537

(56) References Cited

U.S. PATENT DOCUMENTS

| | | |
|---|---|---|
| 3,933,734 A | 1/1976 | Mark et al. |
| 4,251,434 A | 2/1981 | Mark et al. |
| 4,263,201 A | 4/1981 | Mark et al. |
| 5,837,757 A | 11/1998 | Nodera et al. |
| 6,127,465 A | 10/2000 | Nodera |
| 6,150,443 A | 11/2000 | Nodera et al. |
| 6,174,944 B1 | 1/2001 | Chiba et al. |
| 6,197,857 B1 | 3/2001 | Nodera et al. |
| 6,331,584 B1 | 12/2001 | Nodera et al. |
| 6,348,527 B1 | 2/2002 | Nodera |
| 6,369,142 B1 | 4/2002 | Nodera et al. |
| 6,498,228 B1 * | 12/2002 | Nodera et al. ............... 528/196 |

FOREIGN PATENT DOCUMENTS

| | | |
|---|---|---|
| EP | 2 36 50 | 2/1981 |
| EP | 3 42 65 | 8/1981 |

OTHER PUBLICATIONS

U.S. Appl. Ser. No. 09/857,865, Kitayama, et al., filed Jun. 12, 2001.
U.S. Appl. Ser. No. 09/926,614, Isozaki, filed Nov. 26, 2001.

* cited by examiner

*Primary Examiner*—Cephia D. Toomer
(74) *Attorney, Agent, or Firm*—Oblon, Spivak, McClelland, Maier & Neustadt, P.C.

(57) ABSTRACT

Provided is a non-halogen, flame-retardant polycarbonate resin composition that comprises a resin mixture of (A) from 60 to 99% by mass of a polycarbonate resin and (B) from 1 to 40% by mass of a polycarbonate copolymer having phosphorus atoms in its main chain, and contains (C) from 0.02 to 5 parts by mass, relative to 100 parts by mass of the resin mixture, of an anti-dripping agent. Also provided are moldings of the composition. The polycarbonate copolymer (B) that has phosphorus atoms in its main chain is typically a polycarbonate copolymer of which the repetitive structural units contain an aromatic organophosphate component. The resin moldings have good impact resistance, good heat resistance and high stiffness intrinsic to polycarbonate resin. Not depositing on the wall of molds, the melt of the resin composition is well flowable and is stably molded into high-quality moldings having good appearance, and its long-run workability is good.

15 Claims, No Drawings

FLAME-RETARDANT POLYCARBONATE RESIN COMPOSITION AND MOLDED ARTICLES

TECHNICAL FIELD

The present invention relates to a flame-retardant polycarbonate resin composition. Precisely, the invention relates to a flame-retardant polycarbonate resin composition and its moldings, which do not contain halogen but contain minor additives to exhibit good flame retardancy, and which have good impact resistance, good stability to molding heat, good wet heat resistance and good recyclability, and are resistant to static electrification.

BACKGROUND ART

As having the advantages of impact resistance, heat resistance, good electric properties and dimensional stability, polycarbonate resins have many applications in various fields of, for example, OA (office automation) appliances, information and communication appliances, other electric and electronic appliances for industrial use and household use, automobile parts and building materials. As a rule, polycarbonate resins are self-extinguishable. However, in some fields of typically OA appliances, information and communication appliances, and other electric and electronic appliances, it is desirable that the level of the flame retardancy of the products is increased for ensuring further safety of the products.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good. However, with the recent tendency toward safety living and environmental protection from discarded and incinerated wastes, the market requires flame retardation with non-halogen flame retardants. Polycarbonate resin composition containing, as a non-halogen flame retardant, any of phosphorus-containing organic flame retardants, especially organic phosphate compounds have good flame retardancy. In addition, organic phosphate compounds serve as a plasticizer, and various types of compositions containing them have been proposed.

In order to make polycarbonate resins have good flame retardancy by adding thereto a phosphate compound, a relatively large amount of the compound must be added to the resins. In general, polycarbonate resins require relatively high molding temperatures, and their melt viscosity is high. Therefore, for molding them into thin-walled and large-sized moldings, the molding temperature will have to be further higher. For these reasons, phosphate compounds often cause some problems when added to such polycarbonate resins, though their flame-retarding ability is good. For example, phosphate compounds often adhere to molds used for molding resins containing them, and generate gas to have some unfavorable influences on the working environments and even on the appearance of the moldings. Another problem with phosphate compounds is that, when the moldings containing them are left under heat or in high-temperature and high-humidity conditions, the compounds lower the impact strength of the moldings and yellow the moldings. On the other hand, the recent tendency in the art is toward recycling resin products for saving natural resources. However, as not stable under heat, phosphate compounds are against the requirement for recycling resin products containing them. This is still another problem with phosphate compounds.

Apart from the above, known is another technique of adding silicone compounds to polycarbonate resins to make the resins have flame retardancy. In this, silicone compounds do not give toxic gas when fired. For example, (1) Japanese Patent Laid-Open No. 139964/1998 discloses a flame retardant that comprises a silicone resin having a specific structure and a specific molecular weight.

(2) Japanese Patent Laid-Open Nos. 45160/1976, 318069/1989, 306265/1994, 12868/1996, 295796/1996, and Japanese Patent Publication No. 48947/1991 disclose silicone-containing flame-retardant polycarbonate resins. The level of the flame retardant disclosed in (1) is high in some degree. The technology of (2) differs from that of (1) in that the silicones used in (2) do not act as a flame retardant by themselves, but are for improving the drip resistance of resins, and some examples of silicones for that purpose are mentioned. Anyhow, in (2), the resins indispensably require an additional flame retardant of, for example, phosphate compounds or salts of Group 2 metals.

Japanese Patent Laid-Open No. 176425/1996 discloses a method of using an organic alkali metal or alkaline earth metal salt and a polyorganosiloxane for improving the flame retardancy of polycarbonate resins without detracting from the transparency thereof. In this, however, the flame retardancy of the resin compositions could be improved, but the impact resistance thereof is often lowered.

Japanese Patent Laid-Open No. 172063/1999 discloses a flame-retardant thermoplastic resin material for molding, which comprises (A) from 1 to 99 parts by weight of an aromatic vinyl resin having an acidbase such as an alkali metal sulfonate, and (B) from 1 to 99 parts by weight of a thermoplastic resin except (A); and a flame-retardant thermoplastic resin material for molding, which comprises 100 parts by weight of the resin mixture of (A) and (B), and from 0.1 to 100 parts by weight of a flame retardant (C) added thereto. Concretely, it discloses <1> a molding material comprising 90 parts by weight of (A) and 10 parts by weight of (B) GPSS [polystyrene]; and <2> a molding material comprising 10 parts by weight of (A), 80parts by weight of (B) PPE [polyphenylene ether] and 10 parts by weight of (C) TPP [triphenyl phosphate].

The laid-open patent publication shows the case <1> in which the content of the aromatic vinyl resin having an acid base such as an alkali metal sulfonate is 90% by weight and is extremely large, and the case <2> in which the content of the resin is 10% by weight and is small and the resin is combined with the additional flame retardant. In other words, when the content of the component (A) is small therein, the molding material is not resistant to flames. Accordingly, as is obvious from Comparative Example 1 therein, the component (A) alone cannot be molded into shaped articles. The serious problem with the technique disclosed is that a large amount of an aromatic vinyl resin having an acid base such as an alkal metal sulfonate must be used therein. Accordingly, the moldings obtained therein could be self-extinguishable and resistant to flames, but their physical properties intrinsic to thermoplastic resin would be significantly worsened.

In the current situation as above, the object of the present invention is to provide a flame-retardant polycarbonate resin composition containing a non-halogen flame retardant enough to ensure good flame retardancy and capable of being formed into good moldings which have good impact resistance, good thermal stability and good wet heat resistance intrinsic to polycarbonate resin, and which are recyclable and are resistant to static electrification; and to provide such moldings of the composition.

DISCLOSURE OF THE INVENTION

To attain the object of the invention, we, the present inventors have assiduously studied to find out additives that may serve as a flame retardant for polycarbonate resins, not detracting from the impact resistance, the heat resistance and the recyclability of the resin moldings containing them. As a result, we have found that, when a small amount of an acid base-containing aromatic vinyl resin is combined with a drip inhibitor and when the resulting combination is added to polycarbonate resin, then the resulting polycarbonate resin composition has good flame retardancy and its moldings have good impact resistance, good heat resistance and good wet heat resistance and are resistant to static electrification. In addition, we have further found that even when the moldings are recycled in a mode of re-melting them and re-molding the resulting melt, the thus-recycled moldings can still have good physical properties and are yellowed little. On the basis of these findings, we have completed the invention.

Specifically, the invention provides the following:

(1) A flame-retardant polycarbonate resin composition comprising (A) from 90 to 99.98% by weight of a polycarbonate resin, (B) from 0.01 to 5% by weight of an acid base-containing aromatic vinyl resin, and (C) from 0.01 to 5% by weight of a drip inhibitor, wherein the expression of % by weight is based on the total weight of (A), (B) and (C).

(2) The flame-retardant polycarbonate resin composition of (1), which comprises (A) from 97 to 99.96% by weight of a polycarbonate resin, (B) from 0.02 to 1% by weight of an acid base-containing aromatic vinyl resin, and (C) from 0.02 to 2% by weight of a drip inhibitor, wherein the expression of % by weight is based on the total weight of (A), (B) and (C).

(3) The flame-retardant polycarbonate resin composition of (1) or (2), wherein the acid base in the acid base-containing aromatic vinyl resin (B) is a metal sulfonate.

(4) The flame-retardant polycarbonate resin composition of any of (1) to (3), wherein the drip inhibitor (C) is at least one member selected from fluorine resins, silicone resins and phenolic resins.

(5) The flame-retardant polycarbonate resin composition of (4), wherein the drip inhibitor (C) is a fibril-forming polytetrafluoroethylene.

(6) A molding of the polycarbonate resin composition of any of (1) to 5), which is for housings or parts for electric or electronic appliances.

BEST MODES OF CARRYING OUT THE INVENTION

The invention is described in detail hereinunder.
(A) Polycarbonate Resin:

The polycarbonate resin (PC) to be in the resin composition of the invention is not specifically defined, and may be any and every one known in the art. Generally used herein are aromatic polycarbonates to be produced from diphenols and carbonate precursors. For example, herein used are polycarbonates as produced by reacting a diphenol and a carbonate precursor in a solution method or in a melt method, such as those produced through reaction of a diphenol and phosgene or through interesterification of a diphenol and a diphenyl carbonate.

Various diphenols are usable, typically including 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis(4-hydroxyphenyl) oxide, bis(4-hydroxyphenyl)sulfide, bis(4-hydroxyphenyl) sulfone, bis(4-hydroxyphenyl)sulfoxide, bis(4-hydroxyphenyl) ether, and bis(4-hydroxyphenyl) ketone.

As the diphenols for use herein, preferred are bis(hydroxyphenyl)alkanes, especially those consisting essentially of bisphenol A. The carbonate precursors for use in the invention include, for example, carbonyl halides, carbonyl esters, and haloformates, concretely, phosgene, diphenol dihaloformates, diphenyl carbonate, dimethyl carbonate, and diethyl carbonate. Other diphenols such as hydroquinone, resorcinol, and catechol are also usable in the invention. The diphenols mentioned herein may be used either singly or as combined.

The polycarbonate resin may have a branched structure, for which the branching agent includes, for example, 1,1,1-tris(4-hydroxyphenyl)ethane, $\alpha,\alpha',\alpha''$-tris(4-hyroxyphenyl)-1,3,5-triisopropylbenzene, phloroglucine, trimellitic acid, and isatin-bis(o-cresol). For controlling the molecular weight of the polycarbonate resin, for example, employable are phenol, p-t-butylphenol, p-t-octylphenol, and p-cumylphenol.

The polycarbonate resin for use in the invention may be a copolymer having a polycarbonate moiety and a polyorganosiloxane moiety, or may also be a polycarbonate resin containing a copolymer of the type. Further, it may also be a polyester-polycarbonate resin to be produced through polymerization of a polycarborate in the presence of an ester precursor, such as a difunctional carboxylic acid (e.g., terephthalic acid) or its ester-forming derivative. Various types of different polycarbonate resins may be mixed to give mixed polycarbonate resins for use in the invention. Preferably, the polycarbonate resin for the component (A) in the invention does not substantially contain halogen in its structure. In view of its mechanical strength and moldability, the polycarbonate resin preferably has a viscosity-average molecular weight of from 10, 000 to 100, 000, more preferably from 11,000 to 40,000, even more preferably from 12,000 to 30,000.

(B) Acid Base-containing Aromatic Vinyl Resin:

The acid base-containing aromatic vinyl resin for use in the invention is a thermoplastic aromatic vinyl resin in which the aromatic ring is substituted with an acid base. The aromatic vinyl resin is a thermoplastic resin having at least astyrenic structure, which includes, for example, polystyrenes, rubber-modified polystyrenes, styrene-acryloritrile copolymers, and ABS resins. Of those, preferred are polystyrene resins.

The acid base to be bonded to the aromatic ring in the aromatic vinyl resin is not specifically defined, including, for example, bases of sulfonic acid, bases of boric acid and bases of phosphoric acid. Concretely, they are alkali metal salts, alkaline earth metal salts and ammonium salts of the acids. The ratio of substitution with any of such acid bases in the aromatic vinyl resin is not specifically defined, and the resin may contain both a substituted aromatic ring and a non-substituted aromatic ring.

Preferred examples of the acid base-containing aromatic vinyl compound are mentioned below. The following formula (1) represents acid base-containing polystyrene resins.

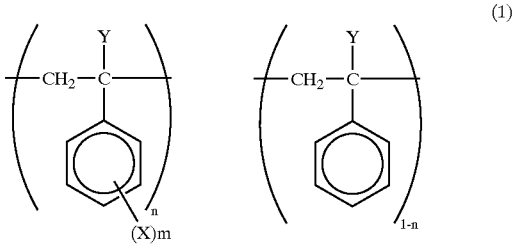

wherein X represents an acid base; m falls between 1 and 5; Y represents a hydrogen atom or a hydrocarbon residue having from 1 to 10 carbon atoms; and n indicates a molar fraction, falling within a range of $0<n\leq1$.

The acid base of X is any of bases of sulfonic acid, bases of boric acid and bases of phosphoric acid, including, for example, alkali metal salts, alkaline earth metal salts and ammonium salts of the acids. The metal includes, for example, sodium, aluminium, potassium, lithium, rubidium, cesium, beryllium, magnesium, calcium, strontium, barium, zincand tin.

Y is a hydrogen atom or a hydrocarbon residue having from 1 to 10 carbon atoms, and is preferably a hydrogen atom or a methyl group. m falls between 1 and 5; and $0<n\leq1$. Concretely, the acid base, X, may be bonded to all the bonds extending from the aromatic ring, or may be partially bonded to some bonds from it. As the case may be, a part of the aromatic rings in the polystyrene resin may have no acid base bonded thereto. For obtaining the flame retardancy intended in the invention, the ratio of substitution with the acid base in the aromatic ring shall be determined in consideration of the content of the acid base-containing aromatic vinyl resin in the resin composition, and is not specifically defined. In general, the ratio of acid base substitution in the aromatic vinyl resin for use in the invention falls between 10 and 100%.

The acid base-containing aromatic vinyl resin for the component (B) is not limited to the polystyrene resins of formula (1), but may be a copolymer of a styrenic monomer and any other comonomer copolymerizable with the monomer, as so mentioned hereinabove. For producing the acid base-containing aromatic vinyl resin, for example, employable is <1>a method of polymerizing or copolymerizing an aromatic vinyl monomer having a sulfonic acid group such as that mentioned above, optionally along with a comonomer capable of copolymerizing with the monomer; or <2>a method of sulfonating an aromatic vinyl polymer, or a copolymer of an aromatic vinyl monomer with any other copolymerizable comonomer, or a mixture of such polymers, followed by neutralizing it with a basic substance.

One example of the method <2>is described. A mixture of concentrated sulfuric acid and acetic anhydride is added to a 1,2-dichloroethane solution of a polystyrene resin, and reacted under heat for a few hours to produce a sulfonated polystyrene. Next, this is neutralized with an equimolar amount, relative to the sulfonic acid group in the polymer, of potassium hydroxide or sodium hydroxide to obtain potassium or sodium polystyrene-sulfonate.

The weight-average molecular weight of the acid base-containing aromatic vinyl resin (B) for use in the invention may fall between 1,000 and 300,000 or so, preferably between 2,000 and 200,000 or so. The weight-average molecular weight of the resin may be measured through gel permeation chromatography (GPC).

(C) Drip Inhibitor:

The drip inhibitor for use in the invention is not specifically defined, so far as it has the ability to prevent the polycarbonate resin from melting and dripping from the resin moldings. For example, preferred for the drip inhibitor are fluorine resins, especially fluoro-olefin resins. Fluoro-olefin resins for use herein may be ordinary resins or copolymer resins having a fluoroethylene structure. For example, they include difluoroethylene resins, tetrafluoroethylene resins, tetrafluoroethylene-hexafluoropropylene copolymer resins, and copolymer resins of tetrafluoroethylene and an ethylenic monomer not containing fluorine. Preferred are polytetrafluoroethylene (PTFE) resins preferably having a mean molecular weight of at least 500,000, more preferably from 500,000 to 10,000,000.

Of such polytetrafluoroethylene resins, more preferred are those having the ability to form fibrils, as they ensure higher drip inhibition. The fibril-forming polytetrafluoroethylene (PTFE) resins are not specifically defined, but preferred is PTEE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), and CD-076 (from Asahi Glass Fluoropolymers).

Others except PTFE of Type 3 are also employable herein, including, for example, Argoflon F5 (from Montefluos), Polyflon MPA and Polyflon FA-100 (both from Daikin Industry). These polytetrafluoroethylene (PTFE) resins may be used either singly or as combined. The fibril-forming polytetrafluoroethylene (PTFE) resins as above maybe obtained, for example, by polymerizing tetrafluoroethylene in an aqueous solvent in the presence of sodium, potassium or ammonium peroxydisulfide, under a pressure of 1 MPa, at a temperature falling between 0 and 200° C., preferably between 20 and 100° C.

In addition to the fluoro-olefin resins, per-se known compounds are also usable for the drip inhibitor. For example, silicone resins such as polyorganosiloxanes are usable, and they include polydimethylsiloxane resins, polymethylpheny siloxane resins, polydiphenylsiloxane resins, polymethylethylsiloxane resins, and their copolymer resins. In addition, also preferred for the drip inhibitor are modified silicone resins of which the terminals or the side chains of the molecular structure are substituted with any organic group of hydroxyl, amino, epoxy, carboxyl and mercapto groups.

The number-average molecular weight of the silicone resins may be at least 200, but preferably falls between 500 and 5,000,000. The morphology of the silicone resins is not specifically defined, and maybe in any form of oils, varnishes, gums, powders and pellets.

Still other examples of the drip inhibitor are phenolic resins, which may be obtained by reacting a phenol compound, such as phenol, cresol, xylenol or alkylphenol, with analdehyde such as formaldehyde, paraformaldehyde or acetaldehyde, in the presence of a catalyst. The phenolic resins for use herein may be any of resol-type phenolic resins or novolak-type phenolic resins.

The content of each component in the flame-retardant polycarbonate resin composition of the invention is described. The resin composition comprises (A) from 90 to 99.98% by weight, preferably from 97 to 99.96% by weight of a polycarbonate resin, (B) from 0.01 to 5% by weight, preferably from 0.02 to 2% by weight, more preferably from 0;03 to 1% by weight of an acid base-containing aromatic vinyl resin, and (C) from 0.01 to 5% by weight, preferably from 0.02 to 2% by weight of a drip inhibitor. In this, the expression of % by weight is based on the total weight of the components (A), (B), (C). In this, the content of the acid base-containing aromatic vinyl resin (B) may be determined, depending on the level of the desired flame retardancy of the resin composition and in consideration of the ratio of substitution with the acid base group on the aromatic ring in (B) specifically described hereinabove.

If the content of the acid base-containing aromatic vinyl resin (B) in the resin composition is smaller than 0.01% by weight, the flame retardancy and the resistance to static electrification of the resin composition will be poor; but if larger than 5% by weight, the appearance of the resin moldings will be poor, and, in addition, the thermal stability of the resin composition dwelling in molding lines will be poor. Therefore, for obtaining comprehensively excellent moldings, the content of the component (B) therein is preferably small, for example, falling between 0.03 and 1% by weight.

If the content of the drip inhibitor (C) in the resin composition is smaller than 0.02% by weight, the drip-inhibiting ability of the composition will be not enough for the Intended flame retardancy of the composition. However, even if the content is larger than 5% by weight, the effect of the drip inhibitor added could not be augmented any more, and such a large amount of the drip inhibitor, if added to the composition, will have sore negative influences on the impact resistance and the outward appearance of the moldings of the composition. Therefore, the amount of the drip inhibitor to be added to the composition may be suitably determined, depending on the necessary flame retardancy of the moldings of the composition, for example, based on V-0, V-1 or V-2 in UL-94, and depending on the content of the component (B) and also on the amount of the other constituent components.

In case where the moldings of the flame-retardant polycarbonate resin composition of the invention are desired to have higher flame retardancy, various types of flame retardants may be added to the composition. The flame retardant is not specifically defined, and may be any conventional ones. For example, any of organic phosphorus compounds, non-halogen phosphorus compounds, silicone compounds, halogen compounds, nitrogen compounds, metal hydroxides, red phosphorus, antimony oxides, or expanding graphite may be added to the composition, depending on the object of the composition.

The halogen compounds include, for example, tetrabromobisphenol A, halogenopolycarbonates, halogenopolycarbonate copolymers or oligomers, decabromodiphenyl ether, (tetrabromobisphenol)epoxy oligomers, halogenopolystyrenes, and halogenopolyolefins. The nitrogen compounds include, for example, melamine, and alkyl group or aromatic group-substituted melamines; the metal hydroxides include, for example, magnesium hydroxide, and aluminium hydroxide.

Halogen-containing flame retardants are relatively effective, but are unfavorable, as often discharging harmful gases when resin compositions containing them are molded into moldings, or often corroding the molds used, or often discharging harmful substances when the moldings are incinerated. Therefore, preferred are non-halogen flame retardants, as they are safe and do not pollute the environment.

If desired, the polycarbonate resin composition of the invention may contain any other thermoplastic resins, elastomers and inorganic fillers that are effective for improving the moldability of the composition and for improving the impact resistance, the toughness, the chemical resistance and the flame retardancy of the moldings of the composition.

The other thermoplastic resins that may be added to the resin composition of the invention are those compatible with or dispersible in polycarbonate resin. For example, they include polyester resins such as polyethylene terephthalate and polybutylene terephthalate; polystyrene resins including rubber-modified polystyrene resins and syndiotactic structure-having polystyrene resins; polyphenylene-ether resins; polyphenylene-sulfide resins; polymethacrylate resins; and polyolefin resins such as polyethylene, polypropylene, polybutene and their copolymers.

The polystyrene resins may be added to the flame-retardant polycarbonate resin composition of the invention for improving the melt flowability of the resin composition, or that is, for improving the moldability thereof. The polystyrene resins may be polymers that are prepared through polymerization of a monomer or monomer mixture of from 20 to 100% by weight of a monovinylic aromatic monomer such as styrene or α-methylstyrene, from 0 to 60% by weight of a vinyl cyanide-type monomer such as acrylonitrile or methacrylonitrile, and from 0 to 50% by weight of any other vinylic monomer copolymerizable with those monomers, such as maleimide, methyl acrylate or methyl methacrylate. The polymers include, for example, polystyrenes (GPPS), acrylonitrile-styrene copolymers (AS resins).

As the styrenic resins, also preferably used herein are rubber-modified styrenic resins. The rubber-modified styrenic resins are preferably high-impact styrenic resins that are produced through grafting polymerization of rubber with at least styrenic monomers. The rubber-modified styrenic resins include, for example, high-impact polystyrenes (HIPS) produced through polymerization of rubber such as polybutadiene with styrene; ABS resins produced through polymerization of polybutadiene with acrylonitrile and styrene; MBS resins produced through polymerization of polybutadiene with methyl methacrylate and styrene. These rubber-modified styrenic resins may be combined, or may be mixed with other styrenic resins not modified with rubber such as those mentioned above, and the resin mixtures may be used in the invention.

In the rubber-modified styrenic resins, the amount of rubber to modify them may fall, for example, between 2 and 50% by weight, but preferably between 5 and 30% by weight, more preferably between 5 and 15% by weight. If the rubber content is smaller than 2% by weight, the impact resistance of the resin moldings will be poor. If, on the other hand, it is larger than 50% by weight, the thermal stability of the resin composition will be lowered, and the melt flowability thereof will he also lowered. If so, the resin composition will be unfavorably gelled or yellowed. Specific examples of rubber for use herein include polybutaciene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, and ethylene-propyiene rubber. Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 76 mol % of 1,4-cis bonds), and even their mixtures.

Elastomers that may be added to the resin composition of the invention may be various types of elastomers including those used in rubber-modified polystyrene resins. Above all, preferred are grafted elastomers, which have a two-layered structure composed of a core and a shell and in which the core is of a flexible rubber material and the shell that covers the core is of a hard resin material. As a whole, the elastomers themselves are powdery or granular. After blended with a polycarbonate resin in melt, the core/shell-type, grafted elastomer mostly keeps its original powdery or granular condition. Since the grafted elastomer keeps its original powdery or granular condition after having been blended with the resin melt, it can uniformly disperse in the resin composition and is effective for preventing the moldings of the resin composition from being troubled by surface layer peeling.

Known are various core/shell-type, grafted elastomers that are usable herein. Commercially-available products of such elastomers include, for example, Hiblen B621 (from Nippon Zeon), KM-330 (form Rohm & Haas), Metablen W529, Metablen S2001, Metablen C223, Metablen B621 (all from Mitsubishi Rayon).

Among others, preferred are those to be produced through polymerization of one or more vinylic monomers in the presence of a rubber-like polymer that is obtained from monomers of essentially alkyl acrylates or alkyl methacrylates and dimethylsilaxane. In the alkyl acrylates and acryl methacrylates, the alkyl group preferably has from 2 to 10 carbon atoms. Concretely, the alkyl acrylates and methacrylates include, for example, ethyl acrylate, butyl acrylate, 2-ethylhexyl acrylate, and n-octyl methacrylate. One example of the rubber-like elastomers obtained from monomers of essentially those alkyl acrylates is a polymer to be prepared through reaction of at least 70% by weight of the alkyl acrylates with at most 30% by weight of other copolymerizable vinylic monomers such as methyl methacrylate, acrylonitrile, viny acetate, and styrene. To prepare the polymer, a polyfunctional monomer serving as a crosslinking agent, such as divinylbenzene, ethylene dimethacrylate, triallyl cyanurate, or triallyl isocyanurate, may be added to the polymerization system.

The vinylic monomers to be polymerized in the presence of a rubber-like polymer include, for example, aromatic vinyl compounds such as styrene, α-methylstyrene; acrylates such as methyl acrylate, ethyl acrylate; and methacrylates such as methyl methacrylate, ethyl methacrylate. One or more these monomers may be (co)polymerized, as combined, or may be copolymerized with any other vinylic monomers such as vinyl cyanide compounds (e.g., acrylonitrile, methacrylonitrile), and vinyl esters (e.g., vinyl acetate, vinyl propionate). The (co)polymerization may be effected in any known method of, for example, bulk polymerization, suspension polymerization, or emulsion polymerization. Preferred is emulsion polymerization.

It is desirable that the core/shell-type, grafted elastomers thus produced in the manner mentioned above contain at least 20% by weight of the rubber-like polymer moiety.

Typical examples of the core/shell-type, grafted elastomers are MAS resin elastomers such as graft copolymers of styrene and methyl methacrylate with from 60 to 80% by weight of n-butyl acrylate. Especially preferred are composite rubber grafted copolymers to be prepared through graft copolymerization of a composite rubber with at least one vinylic monomer, in which the composite rubber comprises from 5 to 95% by weight of a polysiloxane rubber component and from 5 to 95% by weight of a polyacryl (meth) acrylate rubber component as so entangled that they are not separated from each other, and has a mean particle size of from 0.01 to 1 μm or so. The composite rubber grafted copolymers are better than single rubber crafted copolymers, as their effect of improving the impact resistance of resin moldings is higher than that of the later, single rubber grafted copolymers. Commercial products of such composite rubber grafted copolymers are available, for example, Metablen S-2001 from Mitsubishi Rayon.

Inorganic fillers that may be in the resin composition of the invention are, for example, talc, mica, kaolin, diatomaceous earth, calcium carbonate, calcium sulfate, barium sulfate, glass fibers, carbon fibers, and potassium titanate fibers. Especially preferred for use herein are tabular fillers of, for example, talc and mica, and fibrous fillers. Talc is a magnesium silicate hydrate, and this is available on the market. The inorganic filler such as talc for use herein may have a mean particle size of from 0.1 to 50μm, but preferably from 0.2 to 20 μm. The inorganic filler, especially talc in the resin composition is effective for further enhancing the toughness of the moldings of the composition, and, as the case may be, it will be able to reduce the amount of the flame retardant to be in the composition.

The inorganic filler content of the resin composition may fall between 1 and 100 parts by weight, preferably between 2 and 50 parts by weight, relative to 100 parts by weight of the constituent components (A), (B), (C). If its amount is smaller than 1 part by weight, the inorganic filler added could not satisfactorily exhibit its effect of enhancing the toughness and the flame retardancy of the moldings of the composition; but if larger than 100 parts by weight, the impact resistance of the moldings will lower and the melt flowability of the composition will lower. The amount of the inorganic filler to be in the composition may be suitably determined, depending on the necessary properties of the moldings and the moldability of the composition, especially on the thickness of the moldings and the spiral flow length of the composition.

The flame-retardant polycarbonate resin composition of the invention may contain, in addition to the indispensable components (A), (B) and (C), any additives which are generally added to ordinary thermoplastic resins, if desired. The additives are for further improving the moldability of the composition and for further improving the impact resistance, the outward appearances, the weather resistance and the toughness of the moldings of the composition. They include, for example, phenolic, phosphorus-containing or sulfur-containing antioxidants, antistatic agents, polyamide-polyether block copolymers (for permanent static electrification resistance), benzotriazole-type or benzophenone-type UV absorbents, hindered amine-type light stabilizers (weather-proofing agents), plasticizers, microbicides, compatibilizers, andcolorants (dyes, pigments) For their amount, the optional additives that may be in the flame-retardant polycarbonate resin composition of the invention are not specifically defined, provided that they do not interfere with the properties of the composition.

Methods for producing the flame-retardant polycarbonate resin composition of the invention are described. The resin composition may be produced by mixing and kneading the components (A) to (C) in a predetermined ratio as above, optionally along with the optional components and additives as above in any desired ratio. Formulating and mixing the constituent component into the intended resin composition may be effected in any known manner, for example, by pre-mixing them in an ordinary device, such as a ribbon blender or a drum tumbler, followed by further kneading the resulting pre-mix in a Banbury mixer, a single-screw extruder, a double-screw extruder, a multi-screw extruder, or a cokneader. The temperature at which the components are mixed and kneaded generally falls between 240 and 300° C. For molding the melt mixture, preferably used is an extrusion molding machine, more preferably a vented extruder. Other constituent components than polycarbonate resin may be previously mixed with polycarbonate resin or with any other thermoplastic resin to prepare a master batch.

Having been prepared in the manner as above, the flame-retardant polycarbonate resin composition of the invention may be molded into various moldings in the melt-molding devices as above, or, after it is pelletized, the resulting pellets may be molded into various moldings through injection molding, injection compression molding, extrusion molding, blow molding, pressing, vacuum forming or foaming. Especially preferably, the composition is pelletized in the melt-kneading manner as above, and the resulting pellets are molded into moldings through injection molding or injection compression molding. For injection molding of the composition, employable is a gas-assisted molding method which is effective for preventing sinking and for reducing the weight of the moldings.

Moldings of the flame-retardant polycarbonate resin composition of the invention, especially injection moldings thereof are usable for various housings and parts for electric and electronic appliances, such as duplicators, facsimiles, televisions, radios, tape recorders, video decks, personal computers, printers, telephones, information terminals, refrigerators, and microwave ovens. The moldings have still other applications, and are usable, for example, as automobile parts.

The invention is described more concretely with reference to the following Examples and Comparative Examples, which, however, are not intended to restrict the scope of the invention.

EXAMPLES 1 TO 5, AND COMPARATIVE EXAMPLES 1 TO 5:

The components shown in Table 1 were blended in the ratio indicated therein (% by weight), fed into a vented double-screw extruder (TEM35 from Toshiba Kikai), melted and kneaded therein at 280° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 120° C. for 12 hours, and then molded into test pieces in a mode of injection molding at 270° C. The mold temperature was 80° C. These test pieces were tested for their properties in various test methods, and their data obtained are given in Table 1.

The molding materials and the additives used herein, and the methods for testing the samples produced are mentioned below.

[Molding Materials]

(A) Polycarbonate Resins:

PC1: Polycarbonate resin having a viscosity-average molecular weight of 27,000.

PC2: Polycarbonate resin having a viscosity-average molecular weight of 19,000.

(B) Polystyrenesuflonates:

PSS-Na: Sodium polystyrenesulfonate having a weight-average molecular weight of 20, 000 and a degree of sulfonation of 100%.

PSS-K: Potassium polystyrenesulfonate having a weight-average molecular weight of 20,000 and a degree of sulfonation of 30%.

(C) Drip Inhibitor:

PTFE: Polytetrafluoroethylene (having the ability to form fibrils), Asahi Glass Fluoropolymers' CD076.

(D) SulFonate:

KFBS: Potassium perfluorobutanesulfonate.

[Test Methods]

1. Izod Impact Strength:

Measured according to ASTMD256. The temperature is 23° C., and the thickness of samples is 3.18 mm. The data are in terms of $kJ/m^2$.

2. Weld Strength:

Using a mold for forming tensile strength test pieces (for weld test), formed are welded test pieces in a mode of two-point-gate molding, and these test pieces are subjected to a tensile test to measure their weld strength.

3. Half-life Period of Static Charge:

Test pieces (25×35×3 mm) are charged with 9 kV applied thereto for one minute. Charging them has been stopped, and their static potential is measured. This is their initial static potential. The time after which the static potential of each sample has decreased to a half of the initial static potential is measured, and this indicates the half-life period of static charge of each sample.

4. Appearance of Moldings:

Using an injection molding machine, Toshiba Kikai's IS-45P, each resin composition is molded into test pieces (80×40×3 mm). The resin temperature is 320° C.; and the mold temperature is 800° C. After 5 cycles, the test pieces are macroscopically checked and evaluated as follows:

⊚: Excellent.

○: Good (with a few fish eyes).

Δ: Average (with some fish eyes).

X: Bad (with many fish eyes).

5. Dwell-time Heat Stability:

Each resin composition is molded into test pieces in the same manner as in the above 4. In this, however, the resin composition is kept stayed in the injection cylinder for 20 minutes, and then molded. The color of the test pieces not stayed in the injection cylinder is compared with that of the test pieces stayed therein. Concretely, the color (L, a, b) of the test pieces directly molded and that of the test pieces molded after having been kept stayed in the cylinder for 20 minutes are measured, and the color difference (ΔE) between them is obtained according to JIS H7103 (yellowing test).

6. Recyclability:

Using the same injection-molding machine as in the above 4, resin composition pellets are molded at 320° C. into housings for portable personal computers (of A4 size). The mold temperature is 80° C. The housings are ground, and 100% recycled into test pieces molded in the same manner as previously. The Izod impact strength of the recycled test pieces is measured in the same manner as in the above 1.

7. High-temperature High-humidity Resistance:

Moldings are kept at a temperature of 70° C. and a humidity of 90% for 1,000 hours, and their Izod impact strength is measured in the same manner as in the above 1.

8. Flame Retardancy:

Tested according to the UL94 combustion test. Samples tested have a thickness of 1.55 1mm. NG samples of V-2 mean that they do not stand the test.

9. Oxygen Index:
Measured according to JIS K7201.

TABLE 1

|  |  |  | Ex. 1 | Ex. 2 | Ex. 3 | Ex. 4 | Ex. 5 | Co. Ex. 1 | Co. Ex. 2 | Co. Ex. 3 | Co. Ex. 4 | Co. Ex. 5 |
|---|---|---|---|---|---|---|---|---|---|---|---|---|
| Composition | A | PC1 | 99.8 |  |  | 98.6 | 96.9 | 100 | 99.8 | 93.7 | 99.3 | 99.5 |
|  |  | PC2 |  | 99.3 | 99.0 |  |  |  |  |  |  |  |
|  | B | PSS-Na | 0.1 |  |  |  | 3.0 |  |  | 6.0 |  | 0.5 |
|  |  | PSS-K |  | 0.5 | 0.8 | 1.2 |  |  |  |  |  |  |
|  | D | KFBS |  |  |  |  |  |  |  |  | 0.5 |  |
|  | C | PTFE | 0.1 | 0.2 | 0.2 | 0.2 | 0.1 |  | 0.2 | 0.3 | 0.2 |  |
| Evaluation |  | 1. Izod impact strength (kJ/m$^2$) | 85 | 85 | 80 | 80 | 75 | 85 | 85 | 30 | 75 | 30 |
|  |  | 2. Weld strength (MPa) | 75 | 75 | 75 | 70 | 65 | 80 | 75 | 40 | 75 | 40 |
|  |  | 3. Half-life time of static charge (sec) | 140 | 80 | 50 | 30 | 3 | >600 | >600 | 3 | >600 | 60 |
|  |  | 4. Appearance of moldings | ○○ | ○○ | ○○ | ○ | Δ | ○○ | ○○ | X | ○○ | ○○ |
|  |  | 5. Dwell-time heat stability (ΔE) | 1 | 1 | 1 | 3 | 5 | 1 | 1 | 20 | 3 | 1 |
|  |  | 6. Izod impact strength of recycled samples (kJ/m$^2$) | 85 | 80 | 80 | 75 | 70 | 85 | 85 | 10 | 20 | 85 |
|  |  | 7. Izod impact strength after exposed to high temperature and high humidity (kJ/m$^2$) | 80 | 75 | 75 | 60 | 20 | 80 | 75 | 5 | 15 | 80 |
|  |  | 8. Flame retardancy [UL94] (thickness: 1.5 mm) | V-0 | V-0 | V-0 | V-0 | V-0 | V-2 NG | V-2 NG | V-2 | V-0 | V-2 |
|  |  | 9. Flame retardancy [oxygen index] | 38 | 39 | 37 | 33 | 32 | 26 | 26 | 30 | 36 | 30 |

As is obvious from the data in Table 1, the moldings of the flame-retardant polycarbonate resin composition of the invention all have good flame retardancy (V-0). When compared with the moldings of Comparative Example 4 not containing the component (B), it is understood that the moldings of the invention all have good dwell-time heat stability, good recyclability and good stability in high-temperature and high-humidity condition. It is also understood that, even when the content of the component (B) therein is small, the resin composition of the invention has good flame retardancy.

INDUSTRIAL APPLICABILITY

The flame-retardant polycarbonate resin composition of the invention keeps high impact resistance and has good dwell-time heat stability, good recyclability and good stability in high-temperature and high-humidity condition. Even when the amount of the additive thereto is small, the resin composition still has good flame retardancy, and is resistant to static electrification. Accordingly, its applications are expected to expand in various fields of, for example, office automation appliances, information appliances, other electric and electronic appliances such as those for household use, automobile car parts.

What is claimed is:

1. A flame-retardant polycarbonate resin composition, comprising:

(A) from 90 to 99.98% by weight of a polycarbonate resin, (B) from 0.01 to 5% by weight of an acid base-containing aromatic vinyl resin and (C) from 0.01 to 5% by weight of a drip inhibitor, wherein said composition does not contain halogen as a flame retardant component and the expression of % by weight is based on the total weight of components (A), (B) and (C), wherein said an acid base-containing aromatic vinyl resin (B) is the only flame retardant in the composition.

2. The flame-retardant polycarbonate resin composition as claimed in claim 1, which comprises:

(A) from 97 to 99.96% by weight of a polycarbonate resin, (B) from 0.02 to 1% by weight of an acid base-containing aromatic vinyl resin and (C) from 0.02 to 2% by weight of a drip inhibitor, wherein the composition does not contain halogen as a flame retardant component and the individual weight percentages are based on the total weight of components (A), (B) and (C), wherein said an acid base-containing aromatic vinyl resin (B) is the only flame retardant in the composition.

3. The flame-retardant polycarbonate resin composition as claimed in claim 1, wherein the acid base in the acid base-containing aromatic vinyl resin (B) is a metal sulfonate.

4. The flame-retardant polycarbonate resin composition as claimed in claim 1, wherein the drip inhibitor (C) is at least one member selected from the group consisting of fluorine resins, silicone resins and phenolic resins.

5. The flame-retardant polycarbonate resin composition as claimed in claim 1, wherein the drip inhibitor (C) is a fibril-forming polytetrafluoroethylene.

6. A molding of the polycarbonate resin composition of claim 1, which is for housings or parts for electric or electronic appliances.

7. The flame-retardant polycarbonate resin composition as claimed in claim 1, wherein the aromatic vinyl resin is a polystyrene, a rubber-modified polystyrene, styrene-acrylonitrile copolymer or an ABS resin and wherein the aromatic resin contains a base form of sulfonic acid groups, a base form of boric acid groups or a base form of phosphoric acid groups.

8. The flame-retardant polycarbonate resin composition as claimed in claim 1, wherein the base forms are the alkali metal, alkaline earth metal and ammonium salts of the acid group containing aromatic vinyl resins.

9. The flame-retardant polycarbonate resin composition as claimed in claim 1, wherein the aromatic vinyl resin is a polystyrene resin of the formula:

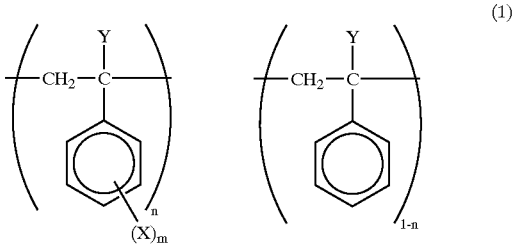

(1)

wherein X is the base form of an acid group, m is an integer ranging from 1 to 5, Y is hydrogen or a $C_{1-10}$ hydrocarbyl group and n is a molar fraction within the range of $0<n\leq1$.

10. The flame-retardant polycarbonate resin composition as claimed in claim 9, wherein the base form of an acid group is an alkali metal salt, alkaline earth metal salt or ammonium salt of a phosphoric acid group, a boric acid group or a sulfonic acid group.

11. The flame-retardant polycarbonate resin composition as claimed in claim 9, wherein the acid group-containing aromatic vinyl resin in base form has a weight average molecular weight ranging from 1,000 to 300,000.

12. The flame-retardant polycarbonate resin composition as claimed in claim 1, wherein the composition contains from 1 to 100 parts by weight of a filler relative to 100 parts by weight of the weight of the sum of components (A), (B) and (C).

13. The flame-retardant polycarbonate resin composition as claimed in claim 1, wherein the composition contains at least one material selected from the group consisting of phenolic, phosphorus-containing or sulfur-containing antioxidants, antistatic agents, polyamide-polyether block copolymer permanent static electrification resistance agents, benzotriazole-type or benzophenone-type UV absorbents, hindered amine-type light stabilizers, weather-proofing agents, plasticizers, microbiocides, compatibilizers and colorants.

14. The flame-retardant polycarbonate resin composition as claimed in claim 1, wherein the composition contains at least one other thermoplastic resin selected from the group consisting of polyester resins, polystyrene resins, polyphenylene-ether resins, polyphenylene-sulfide resins, polymethacrylate resins and polyolefin resins.

15. A flame-retardant polycarbonate resin composition, comprising:

(A) from 90 to 99.98% by weight of a polycarbonate resin, (B) from 0.01 to 5% by weight of an acid base-containing aromatic vinyl resin and (C) from 0.01 to 5% by weight of a drip inhibitor, wherein said composition does not contain halogen as a flame retardant component and the expression of % by weight is based on the total weight of components (A), (B) and (C).

* * * * *